(12) United States Patent
Chung et al.

(10) Patent No.: US 8,426,795 B2
(45) Date of Patent: Apr. 23, 2013

(54) IMAGE DISPLAY APPARATUS WITH ADAPTIVE OPTICS FOR ADJUSTING AN IMAGE SIZE FORMED BY A PROJECTING LIGHT

(75) Inventors: Po-Jen Chung, Hsin-Chu (TW);
Tien-Pao Chen, Hsin-Chu (TW);
Huang-Ming Chen, Hsin-Chu (TW);
Chu-Ming Cheng, Hsin-Chu (TW)

(73) Assignee: Young Optics Inc., Hsinchu Science Park (TW)

( * ) Notice: Subject to any disclaimer, the term of this patent is extended or adjusted under 35 U.S.C. 154(b) by 378 days.

(21) Appl. No.: 12/654,008

(22) Filed: Dec. 8, 2009

(65) Prior Publication Data
US 2010/0149498 A1 Jun. 17, 2010

(30) Foreign Application Priority Data

Dec. 12, 2008 (TW) ................................ 97148326 A

(51) Int. Cl.
*H01L 27/00* (2006.01)
(52) U.S. Cl.
USPC ........................................ 250/208.1; 250/216
(58) Field of Classification Search ............... 250/208.1, 250/239, 216; 353/77, 76, 37, 119; 359/453–460
See application file for complete search history.

(56) References Cited

U.S. PATENT DOCUMENTS

| 5,692,820 A | * | 12/1997 | Gale et al. ........................ 353/77 |
| 6,631,994 B2 | | 10/2003 | Suzuki et al. |
| 7,789,516 B2 | * | 9/2010 | Lee et al. ........................ 353/37 |

FOREIGN PATENT DOCUMENTS

| DE | 102007003797.1 | 1/2007 |
| JP | 2008-145962 | 6/2008 |
| TW | 496999 | 8/2002 |
| TW | 200710433 A | 1/2006 |

OTHER PUBLICATIONS

Office Action dated Nov. 27, 2012 w/translation in Chinese application corresponding to U.S. Appl. No. 12/654,008.

* cited by examiner

*Primary Examiner* — Que T Le
(74) *Attorney, Agent, or Firm* — Bacon & Thomas, PLLC

(57) ABSTRACT

An image display apparatus includes a screen, a reflection mirror, an adaptive optics, and a projection unit. The reflection mirror has a reflective surface facing a light incident surface of the screen, and is separated from the light incident surface by a space. The boundary of the space is defined by the edges of the reflective surface and the light incident surface. The adaptive optics is disposed on the boundary of the space. The projection unit is disposed outside the space. The adaptive optics has a light exit side facing the reflective surface of the reflection mirror, and a light incident side facing the projection unit. A projecting light is generated from the projection unit, passes through the adaptive optics for adjusting the image size formed by the projecting light, and then is projected to the reflective surface of the reflection mirror for being reflected to the light incident surface.

25 Claims, 9 Drawing Sheets

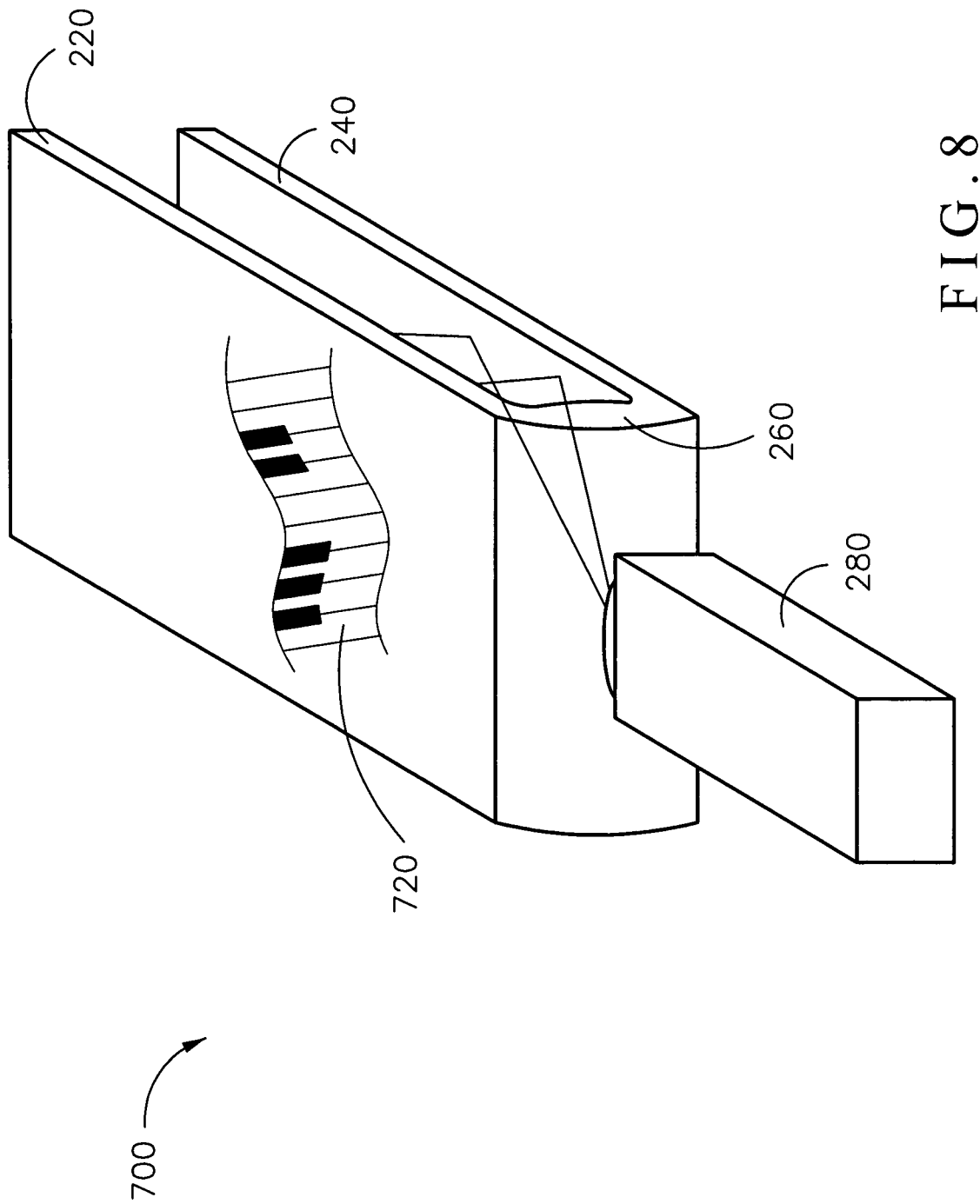
F I G . 8

IMAGE DISPLAY APPARATUS WITH ADAPTIVE OPTICS FOR ADJUSTING AN IMAGE SIZE FORMED BY A PROJECTING LIGHT

BACKGROUND OF THE INVENTION (1) Field of the Invention

The invention relates to an image display apparatus, and especially relates to an image display apparatus having a projection unit therein.

(2) Description of the Prior Art

Generally, slim television (TV) is able to be classified into three categories: plasma TV, LCD TV, and inner projection TV, popularly called rear projection TV, which employs an internal projection unit to produce an image. Normally, the projection unit used in the inner projection TV includes a bulb, a condenser, a digital micro-mirror device (DMD), and a projecting lens. The imaging formation of the projection unit is processed as following sequences: firstly, a light beam, which from the bulb is converged by the condenser, projects on the digital micro-mirror device (DMD); secondly, the light beam is reflected by the micro mirrors of the digital micro-mirror device (DMD) as an image beam; and finally, the image beam passes through the projecting lens to cast on associated faceplate to display a corresponding image.

Please refer to FIGS. 1A and 1B for the front and side elevations respectively showing an internal structure of a conventional inner projection television (TV) 100. The conventional inner projection TV 100 includes a projection unit 110, a folding mirror 120, a curve mirror 130, a plane mirror 140, and a screen 150. The projection unit 110 projects the image beam on the folding mirror 120 for being reflected to the curve mirror 130. By the curve mirror 130, the image beam is reflected to the plane mirror 140 at the rear side of the inner projection TV 100. Afterward the plane mirror 140 directly reflects the image beam to the screen 150 at the front side of the inner projection TV 100 for being viewed by the viewers.

Please refer to FIG. 2 for a pictorial view showing an internal component configuration of the conventional inner projection TV 100. In FIG. 2, the screen 150 locates at rear side of the curve mirror 130, and the plane mirror 140 (not shown in FIG. 2) locates at front side of the projection unit 110, the folding mirror 120, and the curve mirror 130 relative to the screen 150. In other words, the projection unit 110, the folding mirror 120, and the curve mirror 130 are disposed between the plane mirror 140 and the screen 150.

Because the conventional projection unit 110 is disposed between the plane mirror 140 and the screen 150, it may be necessary to take the throw ratio of the projection unit 110, which is defined as the ratio of the projecting distance to the image width, into consideration. For a desired image width, the bigger the throw ratio is, the longer the projecting distance will be required. In this situation, the greater spatial distance between the plane mirror 140 and the screen 150 is needed, for instance, increasing the heights of the plane mirror 140 and the screen 150 or increasing the spatial distance between the plane mirror 140 and the screen 150 to lengthen the projecting distance for obtaining a big enough image width. Whereas, the image width may not be big enough if both the heights of the plane mirror 140 and the screen 150 or the spatial distance between the plane mirror 140 and the screen 150 are constant. However, the increase of the projecting distance or the insufficiency of the image width is unacceptable because it is contradictory to the demand trend for thinner thickness and bigger area of the image display apparatus.

On the other hand, if another projection unit is used in the conventional inner projection TV 100, the design of optical paths among the projection unit 110, the folding mirror 120, the curve mirror 130, the plane mirror 140, and the screen 150 is altered. In other words, both the heights of the plane mirror 140 and the screen 150 or the spatial distance between the plane mirror 140 and the screen 150 should be readjusted accordingly. Therefore, if the projection unit 110 is disposed between the plane mirror 140 and screen 150, the selection of the projection unit 110 is limited to certain degree. In consequence, not only the design model option will be lack of flexibility but also the component configuration will become difficult.

SUMMARY OF THE INVENTION

Accordingly, the object of the invention is to provide an image display apparatus with a projection unit therein for maintaining the image quality and the configuration of the projection unit could be adjusted.

In one aspect, the embodiment of the invention provides an image display apparatus including a screen, a reflection mirror, an adaptive optics, and a projection unit. The screen has a light incident surface. The reflection mirror has a reflective surface. The reflection surface faces the light incident surface of the screen and is separated from the light incident surface by a space. The boundary of the space is defined by the edges of the reflective surface and the edges of the light incident surface. The adaptive optics is disposed on the boundary of the space and has a light exit side and a light incident side. The light exit side faces the reflective surface of the reflection mirror. The projection unit faces the light incident side and is located out of the space. A projecting light is generated from the projection unit, is capable of passing through the adaptive optics for adjusting the image size formed by the projecting light, and then is projected to the reflective surface of the reflection mirror for being reflected to the light incident surface of the screen and passing through the screen.

The reflection mirror is such as a planar mirror, a curve mirror or a folding mirror. The adaptive optics could include two convex lenses; a folding mirror and a curve mirror; or a light guiding element and a folding mirror. In an embodiment, the light guiding element includes a light incident surface facing the projection unit and a light exit surface being substantially orthogonal to the light incident surface.

In an embodiment, a first included angle is formed between the reflective surface of the reflection mirror and a datum plane, and a second included angle is formed between the light incident surface of the screen and the datum plane, wherein the second included angle is twice as big as the first included angle. The datum plane is such as a ground plane.

In an embodiment, the screen, the reflection mirror, and the adaptive optics are formed integrally.

In above embodiments, the screen is such as a Fresnel lens. The projection unit, the reflection mirror and the adaptive optics compose an optical system, and the range of an effective focal length of the optical system is between 2.54 millimeters and 127 millimeters.

The embodiment or the embodiments of the invention may have at least one of the advantages. Because the projection unit is disposed out of the space defined by the edges of the reflective surface and the edges of the light incident surface, the configuration of the projection unit is not confined by the space. The selection of the projection unit is increased and the configuration of the projection unit is flexible. Additionally, the configurations of the screen, the reflection mirror, and the adaptive optics are not confined by the throw ratio of the projection unit.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

FIG. 8 is a pictorial view showing the image display apparatus according to the invention.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figures 1A, 1B:
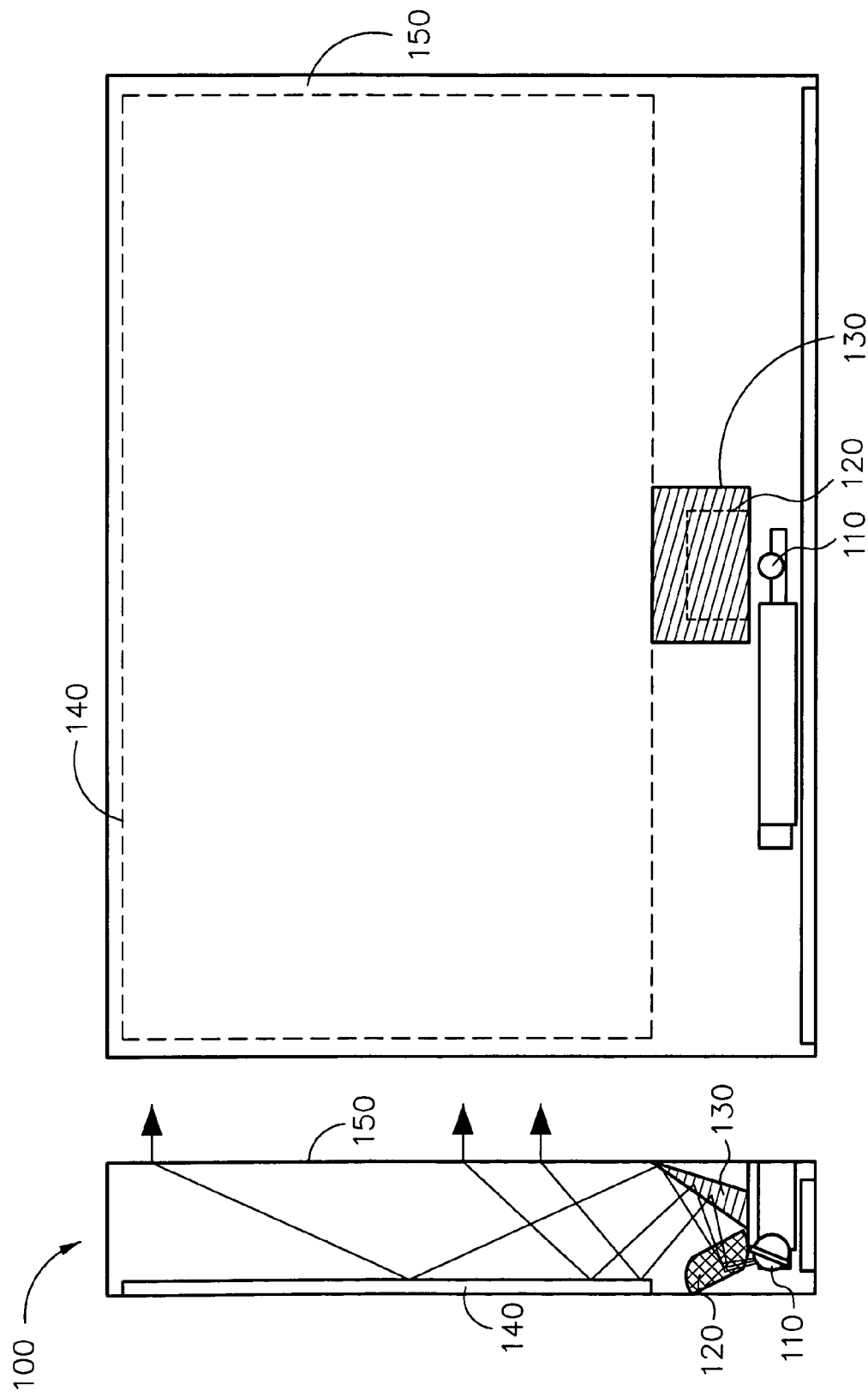
FIG. 1A and FIG. 1B are front and side elevations respectively showing an internal structure of a conventional inner projection television.
Figure 2:
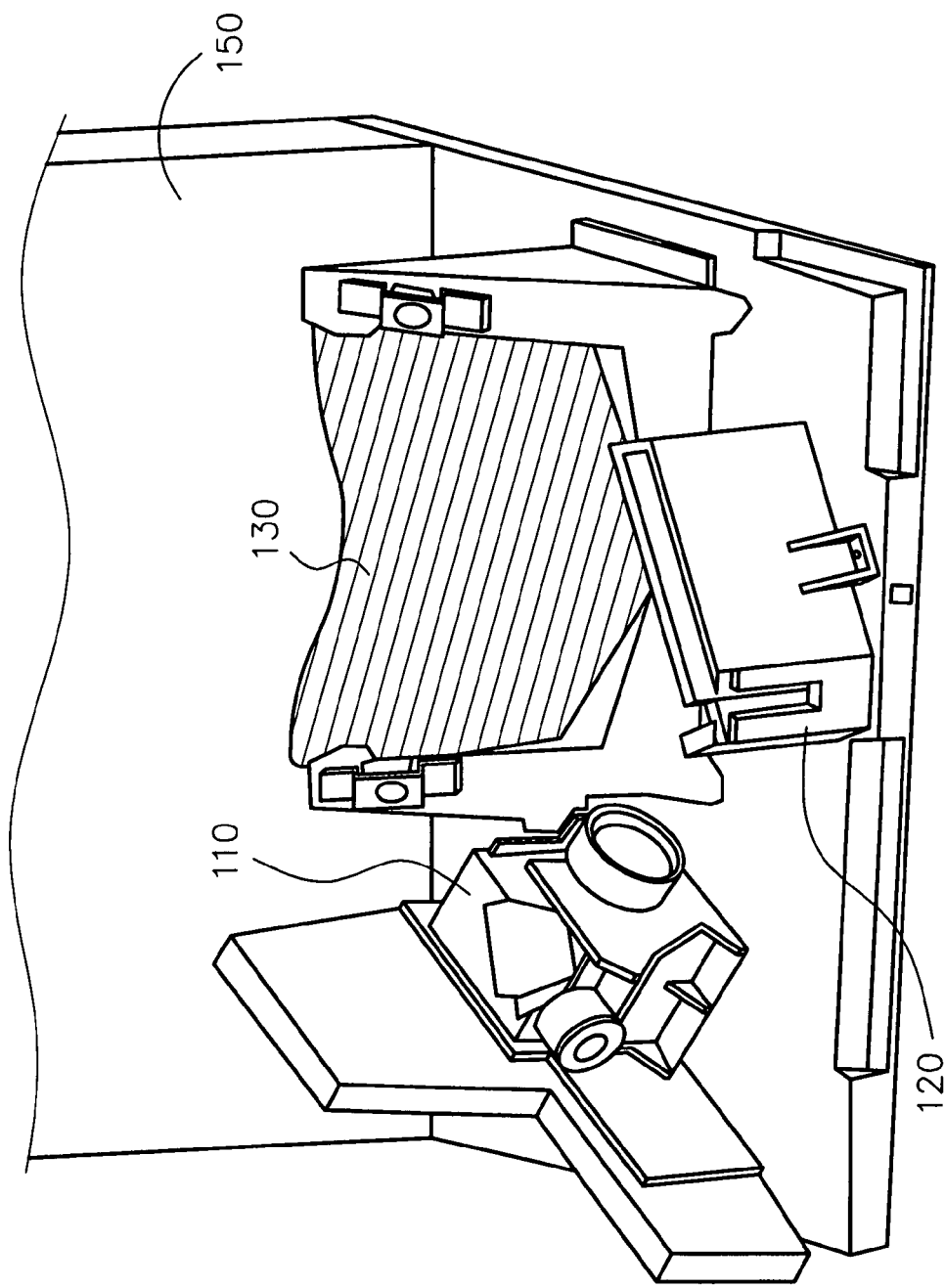
FIG. 2 is a pictorial view showing an internal component configuration of a conventional inner projection television.
Figure 3:
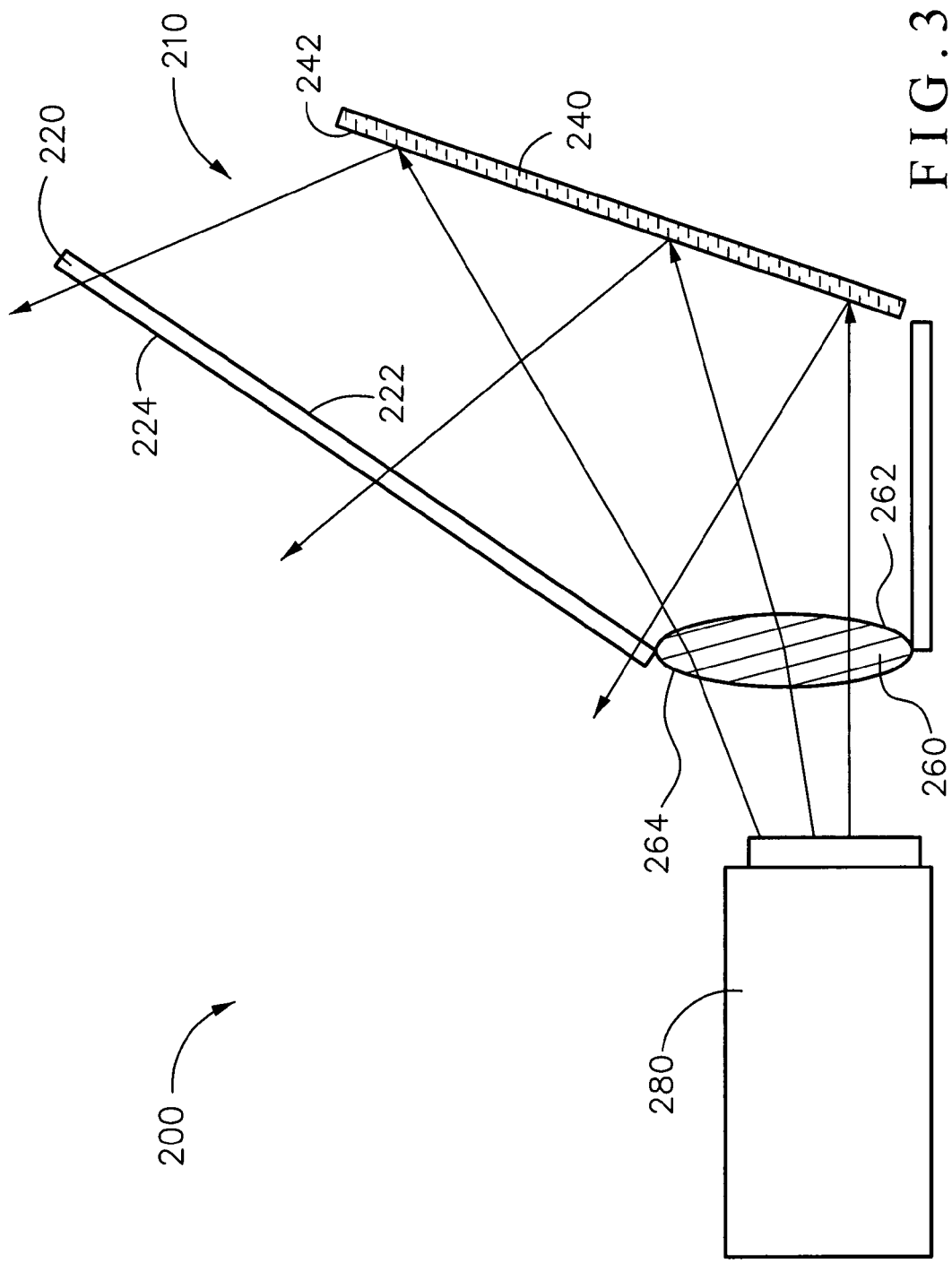
FIG. 3 is a schematic view showing the image display apparatus for the first embodiment according to the invention.

Please refer to FIG. 3 for a schematic view showing an image display apparatus 200 for the first embodiment of the present invention. The image display apparatus 200 includes a screen 220, a reflection mirror 240, an adaptive optics 260, and a projection unit 280. A space 210 is approximately encompassed by the screen 220, the reflection mirror 240, and the adaptive optics 260. The projection unit 280 is out of the space 210.

The screen 220 has a light incident surface 222 and a light exit surface 224. The reflection mirror 240 has a reflective surface 242 facing the light incident surface 222 of the screen 220 so that the reflection mirror 240 and the screen 220 are divided by the space 210. The boundary of the space 210 is defined by the edges of the reflective surface 242 and the edges of the light incident surface 222, and by extensions of those edges.

The adaptive optics 260 is disposed on the boundary of the space 210, and in particular as shown in FIG. 3 on an extension of the edge of the incident surface 222, and has a light exit side 262 and a light incident side 264. The light exit side 262 faces the reflective surface 242 of the reflection mirror 240 and the light incident side 264 faces the projecting lens of the projection unit 280 (no reference number). In other words, the projection unit 280 faces the light incident side 264 of the adaptive optics 260 and locates out of the space 210.

The projection unit 280 generates a projecting light, and the projecting light is transmitted into the light incident side 264 of the adaptive optics 260. The adaptive optics 260 is used for amplify or reducing the image size formed by the projecting light. The projecting light is projected onto the reflective surface 242 of the reflection mirror 240 via the light exit side 262 after modulated by the adaptive optics 260. Then, the projecting light is reflected to the screen 220 by the reflective surface 242. The projecting light passes the screen 220 through the light incident surface 222 and goes onto the light exit surface 224 to become an image thereon for being viewed by viewers.

Generally, because the image display apparatus 200 is thinner and the image size is bigger, the bigger image width is projected when the projecting distance is shorter. However, the throw ratio of the projection unit 280 is stationary, and the throw ratio equals the projecting distance divided by the image width according to the definition of the throw ratio in the conventional technology. For solving such dilemma, the adjustable projecting direction of the adaptive optics 260 without changing the projecting distance is contrived to increase the image width so as to adjust the throw ratio in the embodiment.

In the embodiment, the reflection mirror 240 is a planar mirror for turning the optical path. In another embodiment, because the reflection mirror 240 is not perpendicular to the optical path, the keystone effect must be produced; however, the keystone effect is corrected by angle regulation of the screen 220 in offset manner.

Figure 4:
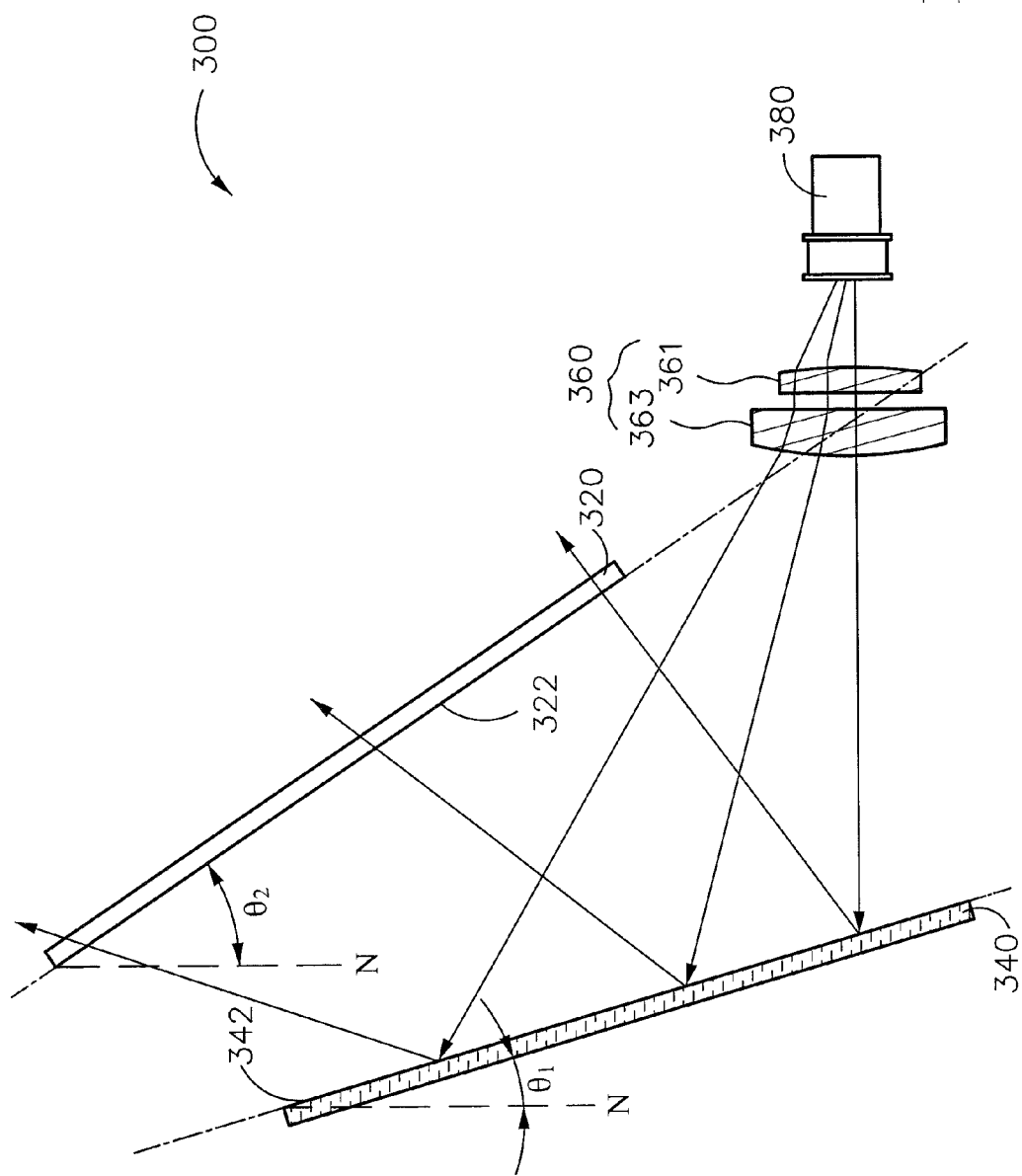
FIG. 4 is a schematic view showing the image display apparatus for the second embodiment according to the invention.

Please refer to FIG. 4, the reflection mirror 340 is a planar mirror in an embodiment of the image display apparatus 300. The adaptive optics 360 includes two convex lenses 361 and 363. As explained above, the adaptive optics 360 is on a boundary of the space between the reflective surface 342 and the incident surface 322, and in particular on an extension of the edge of the reflective surface 322. A first included angle è 1 is formed between the reflective surface 342 of the reflection mirror 340 and a datum plane N such as a ground plane, while a second included angle è 2 is formed between the light incident surface 322 of the screen 320 and the same datum plane N. In another embodiment, the second included angle è 2 is twice of the first included angle è 1, so the keystone distortion or aberration as well as intrinsic distortion of the projection unit 380 is able to be avoided.

Figure 5:
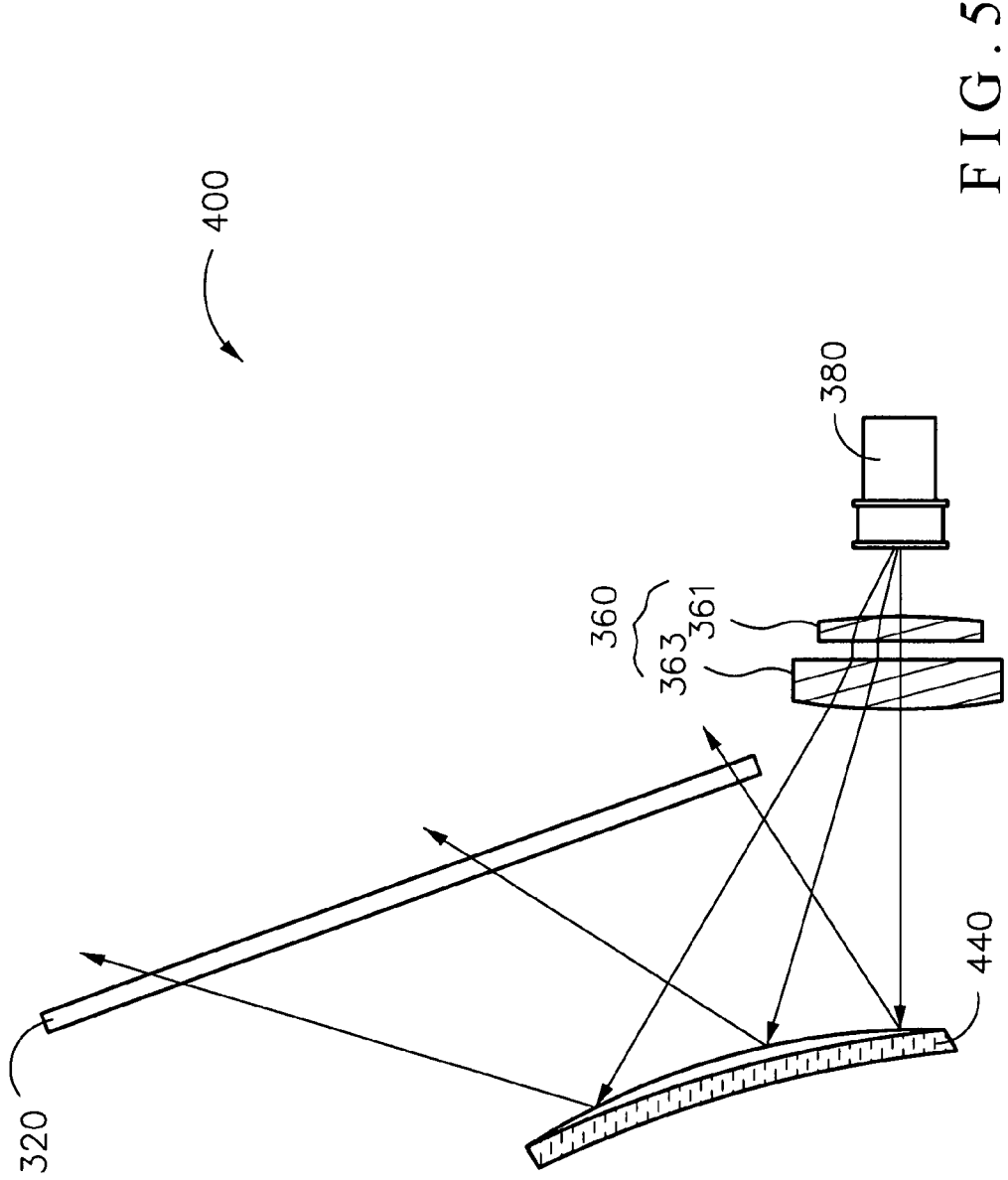
FIG. 5 is a schematic view showing the image display apparatus for the third embodiment according to the invention.

Please refer to FIG. 5, the reflection mirror 440 in the image display apparatus 400 is a curve mirror 440 served to amplify the image so as to shorten the distance between the reflection mirror 440 and the screen 320. The tilt angle of the curve mirror 440 is adjustable to correct distortion. The other components in the embodiment are as shown in FIG. 4.

Figure 6:
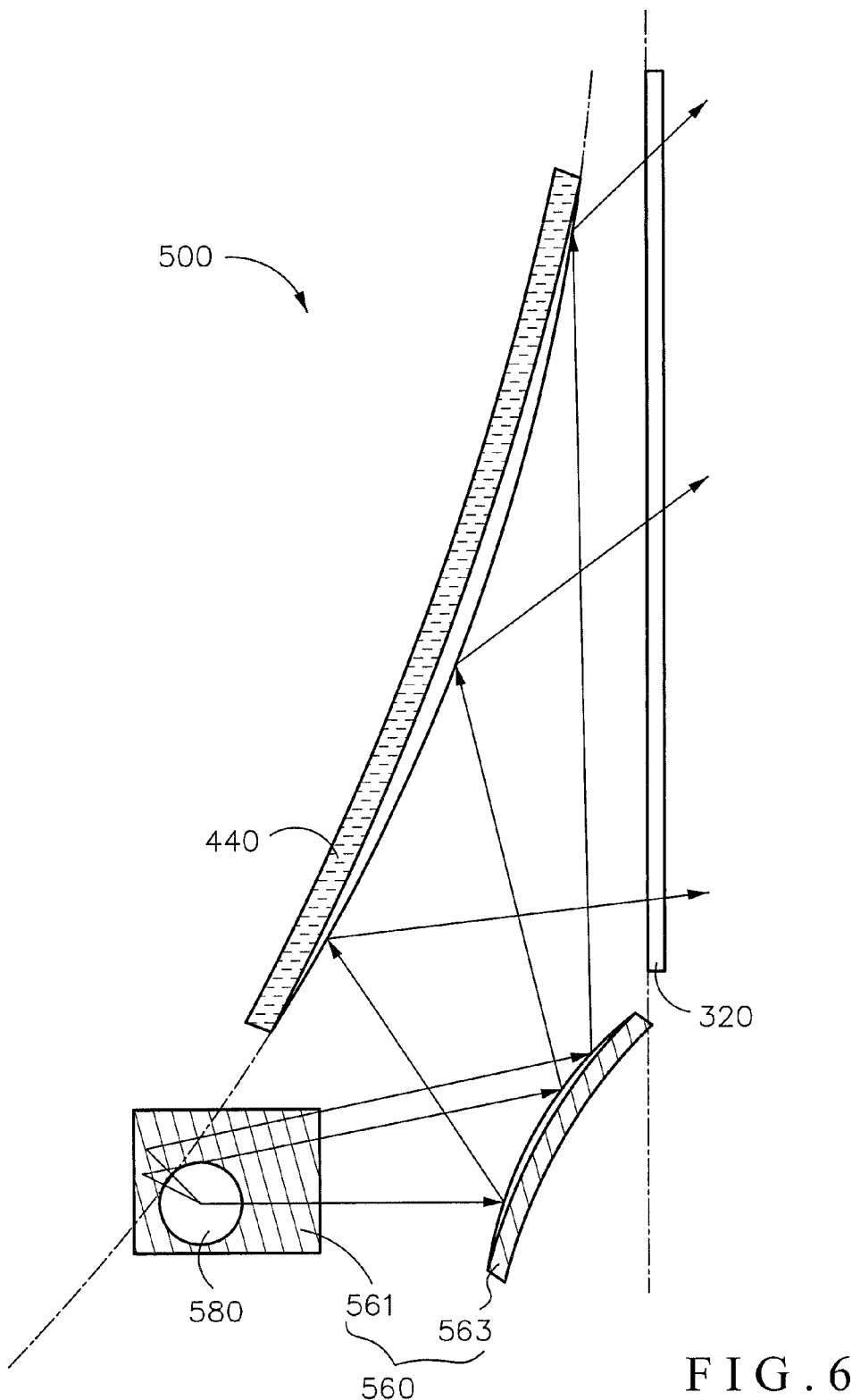
FIG. 6 is a schematic view showing the image display apparatus for the fourth embodiment according to the invention.

Please refer to FIG. 6, the adaptive optics 560 in the image display apparatus 500 includes a folding mirror 561 and a curve mirror 563, again situated on a boundary of the space between a boundary of the space between the reflective surface of reflector 440 and the incident surface of the screen 320, and in particular on respective extensions of the edges of the reflective and incident surfaces. The reflective surface of the folding mirror 561 serves as the light incident side of the adaptive optics 560, and the reflective surface of the curve serves as the light exit side of the adaptive optics 560. The reflection mirror 440 is still used as the curve mirror. In optical function, firstly, the projection unit 580 generates a projecting light onto the folding mirror 561 for reflecting onto the curve mirror 563; secondly, the projecting light is reflected by the curve mirror 563 onto the curve mirror 440; and finally the projecting light is reflected by the curve mirror 440 onto the screen 320 to become an image thereon.

Figure 7:
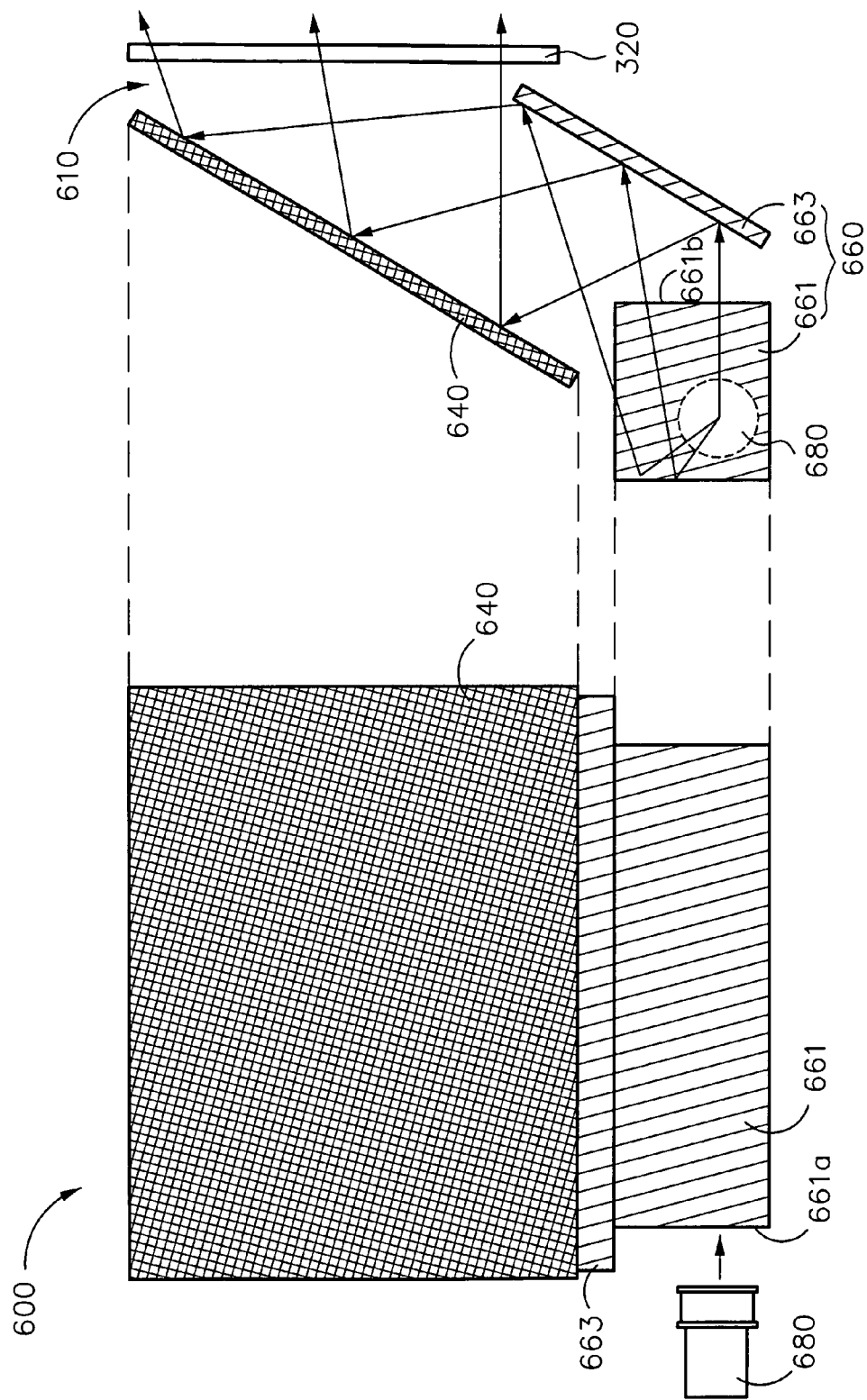
FIG. 7A and FIG. 7B are side and rear elevations respectively showing the image display apparatus for the fifth embodiment according to the invention.

Please refer to FIG. 7A and FIG. 7B for side and rear elevations respectively showing the image display apparatus 600 for an embodiment according to the present invention. In this embodiment, the projecting means of the image display apparatus 600 is implemented sideways. The projection unit 680 is at right side or left side of a light guiding element 661, and the light guiding element 661 includes a light incident surface 661a and a light exit surface 661b. The light incident surface 661a of the light guiding element 661 faces the projection unit 680 and is substantially orthogonal the light exit surface 661b. The light guiding element 661 and a folding mirror 663 compose an adaptive optics 660. The light incident surface 661a of the light guiding element 661 serves as the light incident side of the adaptive optics 660, and the reflective surface of the folding mirror 663 serves as the light exit side of the adaptive optics 660. In the embodiment, the reflection mirror 640, which is for limiting the space 610, is such as a folding mirror.

Please refer to FIG. 8, the structure of the image display apparatus 700 with the planer mirror 240 is simpler and each of the screen 220, the planar mirror 240 and the adaptive optics 260 is easy to be formed into one piece to reduce complexity of manufacturing process. The planar mirror 240 adopted in this embodiment is compatible to suit different kind of projection units with feature in preventing from image distortion if both of the screen 220 and the reflection mirror 240 are properly positioned.

Figure 9:
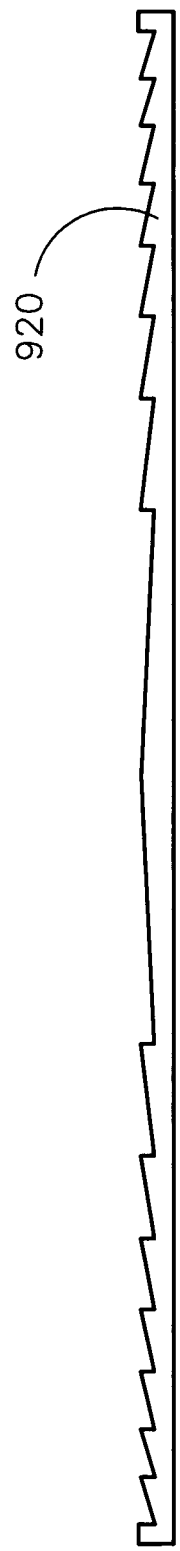
FIG. 9 is a schematic view showing the screen of the image display apparatus according to the invention.

Theoretically, all original light beams generated from a projection unit divergently scatter in even radial manner if no special correction means is applied so that illuminating optical energy flux is uniformly distributed in all radial directions of same spherical surface. However, most viewers normally look the image on the screen from an orthogonal direction to the screen so that most illuminating optical energy out of orthogonal direction are actually scattered in useless manner. In order to solve foregoing issue, as FIG. 9 showing, a Fresnel lens 920 is used as the screen 220, 320 for concentrating all scattered light beams of illuminating optical energy into orthogonal direction to the screen so that the brightness of the screen 220,320 is enhanced to have better and clearer image.

The embodiment or the embodiments of the invention may have at least one of the advantages. For above embodiments, the corresponding projection unit, the reflection mirror, and the adaptive optics are regard as an optical system, and the range of an effective focal length (EFFL) for the optical system is between 2.54 millimeters and 127 millimeters. The screen and the reflection mirror configures an optical framework. Moreover, it is easier to adjust the image screen size and projecting distance because the projection unit and the optical framework are independent each other in separated manner.

The adaptive optics adopted in all embodiments of the present invention feature in image magnification so that even a projection unit with rather big throw ratio is still suit to project the image on the big screen. The projection unit, which is out of the space, provides a vast range of the throw ratio to accommodate various image sizes by adjusting the projecting distance. Therefore, as long as the relative position and distance between the screen and reflection mirror are kept in proper manner, regardless of the value of the throw ratio, the overall performance of the image display apparatus will not be adversely affected. Accordingly, the image display apparatus of the present invention is comprehensively used in projecting accessory of the cellular phone, digital picture frame, vehicle video amusement system and dashboard, aircraft video amusement system and dashboard, miniature bulletin or overhead display and the like.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An image display apparatus, comprising:
    a screen, having a light incident surface;
    a reflection mirror, having a reflective surface facing the light incident surface of the screen and separated from the light incident surface of the screen by a space, and a boundary of the space defined by edges of the reflective surface and edges of the light incident surface;
    an adaptive optics, disposed on the boundary of the space defined by the edges of the reflective surface and the light incident surface and having a light incident side and a light exit side facing the reflective surface of the reflection mirror, said adaptive optics for adjusting an image size formed by a projecting light; and
    a projection unit, facing the light incident side of the adaptive optics and located outside the space,
    wherein the projection unit is capable of generating the projecting light to pass through the adaptive optics for adjusting the image size formed by the projecting light, and the projecting light comprises a plurality of light beams, wherein the light beams do not intersect with each other when passing through the adaptive optics and the light beams also do not intersect with each other before entering into the adaptive optics, and the light beams are projected to the reflective surface of the reflection mirror for being reflected to the light incident surface of the screen and passing the screen.

2. The image display apparatus of claim 1, wherein the reflection mirror is a planar mirror.

3. The image display apparatus of claim 1, wherein the reflection mirror is a folding mirror.

4. The image display apparatus of claim 1, wherein the adaptive optics comprises two convex lenses.

5. The image display apparatus of claim 1, wherein the reflection mirror is a curve mirror.

6. The image display apparatus of claim 1, wherein a first included angle is formed between the reflective surface of the reflection mirror and a datum plane, and a second included angle is formed between the light incident surface of the screen and the datum plane, wherein the second included angle is twice as big as the first included angle.

7. The image display apparatus of claim 6, wherein the datum plane is a ground plane.

8. The image display apparatus of claim 1, wherein the screen, the reflection mirror, and the adaptive optics are formed integrally.

9. The image display apparatus of claim 1, wherein the screen is a Fresnel lens.

10. The image display apparatus of claim 1, wherein the projection unit, the reflection mirror, and the adaptive optics compose an optical system, and the range of an effective focal length of the optical system is between 2.54 millimeters and 127 millimeters.

11. An image display apparatus, comprising:
    a screen, having a light incident surface;
    a reflection mirror, having a reflective surface facing the light incident surface of the screen and separated from the light incident surface of the screen by a space, and a boundary of the space defined by edges of the reflective surface and edges of the light incident surface;
    an adaptive optics, comprising a folding mirror and a curve mirror, and disposed on the boundary of the space defined by the edges of the reflective surface and the light incident surface, wherein the adaptive optics has a light incident side located on the folding mirror and a light exit side located on the curve mirror, and the light exit side facing the reflective surface of the reflection mirror, said adaptive optics for adjusting an image size formed by a projecting light; and
    a projection unit, facing the light incident side of the adaptive optics and located outside the space,
    wherein the projection unit is capable of generating the projecting light to pass through the adaptive optics for adjusting the image size formed by the projecting light, and the image having an adjusted size is projected to the reflective surface of the reflection mirror for being reflected to the light incident surface of the screen and passing the screen, and
    wherein the projecting light comprises a plurality of light beams, the light beams do not intersect with each other when being reflected by the folding mirror, when passing between the folding mirror and the curve mirror, and when being reflected by the curve mirror.

12. The image display apparatus of claim 11, wherein the reflection mirror is a curve mirror.

13. The image display apparatus of claim 11, wherein a first included angle is formed between the reflective surface of the reflection mirror and a datum plane, and a second included angle is formed between the light incident surface of the screen and the datum plane, wherein the second included angle is at least twice as big as the first included angle.

14. The image display apparatus of claim 13, wherein the datum plane is a ground plane.

15. The image display apparatus of claim 11, wherein the screen, the reflection mirror, and the adaptive optics are formed integrally.

16. The image display apparatus of claim 11, wherein the screen comprises a Fresnel lens.

17. The image display apparatus of claim 11, wherein the projection unit, the reflection mirror, and the adaptive optics compose an optical system, and range of an effective focal length of the optical system is between 2.54 millimeters and 127 millimeters.

18. An image display apparatus, comprising:
    a screen, having a light incident surface;
    a reflection mirror, having a reflective surface facing the light incident surface of the screen and separated from the light incident surface of the screen by a space, and a boundary of the space defined by edges of the reflective surface and edges of the light incident surface;
    an adaptive optics, comprising a light guiding element and a folding mirror, and disposed on the boundary of the space defined by the edges of the reflective surface and the light incident surface, wherein the adaptive optics has a light incident side located on the light guiding element and a light exit side located on the folding mirror, and the light exit side facing the reflective surface of the reflection mirror, said adaptive optics for adjusting an image size formed by a projecting light; and
    a projection unit, facing the light incident side of the adaptive optics and located outside the space,
    wherein the projection unit is capable of generating the projecting light to pass through the adaptive optics for adjusting the image size formed by the projecting light, and the image having an adjusted size is projected to the reflective surface of the reflection mirror for being reflected to the light incident surface of the screen and passing the screen, and wherein the projecting light comprises a plurality of light beams, the light beams do not intersect with each other when passing through the light guiding element, when passing between the light guiding element and the folding mirror, and when being reflected by the folding mirror.

19. The image display apparatus of claim 18, wherein the light guiding element comprises a light incident surface facing the projection unit and a light exit surface being substantially orthogonal to the light incident surface of the light guiding element.

20. The image display apparatus of claim 18, wherein the reflection mirror is a folding mirror.

21. The image display apparatus of claim 18, wherein a first included angle is formed between the reflective surface of the reflection mirror and a datum plane, and a second included angle is formed between the light incident surface of the screen and the datum plane, wherein the second included angle is twice as big as the first included angle.

22. The image display apparatus of claim 21, wherein the datum plane is a ground plane.

23. The image display apparatus of claim 18, wherein the screen, the reflection mirror, and the adaptive optics are formed integrally.

24. The image display apparatus of claim 18, wherein the screen comprises a Fresnel lens.

25. The image display apparatus of claim 18, wherein the projection unit, the reflection mirror, and the adaptive optics compose an optical system, and range of an effective focal length of the optical system is between 2.54 millimeters and 127 millimeters.

* * * * *